United States Patent [19]
Yamamoto et al.

[11] Patent Number: 6,127,065
[45] Date of Patent: Oct. 3, 2000

[54] METHOD OF MANUFACTURING CATHODE ACTIVE MATERIAL AND NONAQUEOUS ELECTROLYTE SECONDARY BATTERY

[75] Inventors: Yoshikatsu Yamamoto; Hisayuki Kato; Hironao Takagishi, all of Fukushima, Japan

[73] Assignee: Sony Corporation, Tokyo, Japan

[21] Appl. No.: 09/064,619

[22] Filed: Apr. 23, 1998

[30] Foreign Application Priority Data

Apr. 25, 1997 [JP] Japan ..................................... 9-109783

[51] Int. Cl.$^7$ ...................................................... H01M 4/58
[52] U.S. Cl. ................................ 429/218.1; 429/231.1; 429/231.3; 429/231.95; 423/594
[58] Field of Search ............................. 429/231.3, 231.1, 429/231.95, 218.1; 423/594

[56] References Cited

U.S. PATENT DOCUMENTS 4,668,595   5/1987   Yoshino et al. ..................... 429/231.3

*Primary Examiner*—Laura Weiner
*Attorney, Agent, or Firm*—Hill & Simpson

[57] ABSTRACT

A method of manufacturing a cathode active material and a nonaqueous electrolyte secondary battery including the cathode active material and having a large capacity, an excellent cycle characteristic at high environmental temperatures and satisfactory discharging characteristic under a large load are provided. Cobalt salts, lithium salts and aluminum hydroxide salts are mixed with one another and a prepared mixture is baked so that a cathode active material is obtained which is expressed by $Li_xCo_{(1-y)}Al_yO_2$ (where $0.05 \leq x \leq 1.10$ and $0.01 \leq y < 0.10$) is obtained.

5 Claims, 1 Drawing Sheet

METHOD OF MANUFACTURING CATHODE ACTIVE MATERIAL AND NONAQUEOUS ELECTROLYTE SECONDARY BATTERY

BACKGROUND OF THE INVENTION

1. Field of the Invention

The present invention relates to a method of manufacturing a cathode active material for use in a nonaqueous electrolyte secondary battery and to a nonaqueous electrolyte secondary battery.

2. Related Background Art

In recent years significant advances have improved the performance of electronic apparatuses and reduced the size of each apparatus to realize portability. Thus, there arises a need for high energy density batteries adaptable to the foregoing electronic apparatuses. Under the above-mentioned circumstance, a lithium-ion secondary battery has become commercial which contains $LiCoO_2$ serving as a cathode material and a carbon material serving as an anode material with which lithium can be doped and removed. The lithium-ion secondary batteries have been widely used in a variety of portable electronic apparatuses, such as camcorders, portable telephones and notebook computers.

At the present time, improvement in $LiCoO_2$ has been attempted to furthermore improve the characteristics of the lithium-ion secondary battery.

For example, a contrivance has been disclosed in Japanese Patent Laid-Open No. 4-253162 in order to realize an excellent cycle characteristic enabling thorough charge and discharge. The contrivance has a structure that a material obtained by substituting at least one element selected from Pb, Bi and B substituted for a portion of $LiCoO_2$ is employed as a cathode active material. According to the above-mentioned disclosure, lithium carbonate, cobalt carbonate and lead dioxide or bismuth oxide or boron oxide is crushed in a ball mill so as to be mixed, and then the mixture is baked in air. Thus, a required cathode active material is obtained. In Japanese Patent Publication No. 4-24831, Japanese Patent Laid-Open No. 7-176302 and Japanese Patent Laid-Open No. 7-176303, use of a composite oxide expressed by $A_xM_yN_zO_2$ (where A is at least one type selected from alkali metal elements, M is transition metal, N is at least one type selected from Al, In and Sn, and x, y and z satisfy $0.05 \leq x \leq 1.10$, $0.85 \leq y \leq 1.00$ and $0.001 \leq z \leq 0.10$) is disclosed. As embodiments of the foregoing disclosure, $Li_{1.03}Co_{0.95}Sn_{0.042}O_2$, $Li_{1.01}Co_{0.95}In_{0.04}O_2$ and $Li_{1.02}Co_{0.96}In_{0.04}O_2$ are disclosed. In the above-mentioned disclosure, lithium carbonate, cobalt oxide, stanic oxide or indium oxide or aluminum oxide are mixed followed by baking the mixture in air. Thus, a required cathode active material is obtained.

However, the lithium-ion secondary batteries are widely employed in electronic apparatuses arranged to be operated in various environmental temperature conditions from low temperatures to high temperatures as well as those arranged to be operated at room temperatures. In particular, notebook personal computers each having a high-speed central processing unit encounters rise in the internal temperature thereof. Since the mounted lithium-ion secondary battery is used for a long time at high environmental temperatures, satisfactory characteristics at high environmental temperatures are required for the lithium-ion secondary battery.

However, a fact has been found that the conventional lithium-ion secondary battery including the lithium cobalt oxide as the cathode active material thereof is capable of exhibiting an excellent cycle characteristic if it is thoroughly charged and discharged. Moreover, the capacity of the lithium-ion secondary battery can easily be reduced if it is used or reserved at high environmental temperatures.

Moreover, the lithium cobalt oxide including various elements as described above encounters a difficulty that another element cannot generally easily be substituted for cobalt to form a solid solution while a layered structure is maintained. If start materials and a state of mixture of the start materials are unsuitable, the performance of the active material deteriorates excessively.

SUMMARY OF THE INVENTION

Accordingly, an object of the present invention is to provide a method of manufacturing a cathode active material and a nonaqueous electrolyte secondary battery including the cathode active material and having a large capacity, free from deterioration in the capacity even if the nonaqueous electrolyte secondary battery has been used and reserved at high environmental temperatures and exhibiting excellent characteristics even under a large load.

To achieve the above-mentioned object, according to one aspect of the present invention, there is provided a method of manufacturing a cathode active material including the steps of: mixing cobalt salts, lithium salts and aluminum hydroxide salts with one another; and baking a prepared mixture so that lithium composite oxides are obtained each of which is expressed by $Li_xCo_{(1-y)}Al_yO_2$ (where $0.05 \leq x \leq 1.10$ and $0.01 \leq y < 0.10$).

The present invention has the structure that the cathode active material expressed by the general formula $Li_xCo_{(1-y)}Al_yO_2$ (where $0.05 \leq x \leq 1.10$ and $0.01 \leq y < 0.10$) is prepared from aluminum hydroxide which serves as the aluminum source. Therefore, the stability of crystal of the cathode active material can be improved as compared with the cathode active material prepared in such a manner that aluminum hydroxide is employed as the aluminum source. Moreover, a large capacity can be maintained even at high environmental temperatures. Moreover, excellent load resistance can be realized.

As a result, a nonaqueous electrolyte secondary battery including the foregoing cathode active material has a large capacity is enabled to be free from reduction in the capacity at high environmental temperatures and exhibits excellent load resistance.

According to another aspect of the present invention, there is provided a nonaqueous electrolyte secondary battery including: a cathode including lithium composite oxides expressed by a general formula $Li_xCo_{(1-y)}Al_yO_2$ (where $0.05 \leq x \leq 1.10$ and $0.01 \leq y < 0.10$) as an active material thereof; an anode made of non-graphitizable carbon material into which lithium can be doped and from which doped lithium can be removed, and nonaqueous electrolyte, wherein a ratio obtained by dividing a discharging capacity realized after 200 cycles have been performed at 60° C. by an initial capacity is 80% or higher.

Other objects, features and advantages of the invention will be evident from the following detailed description of the preferred embodiments described in conjunction with the attached drawings.

DESCRIPTION OF PREFERRED EMBODIMENTS

Figure 1:
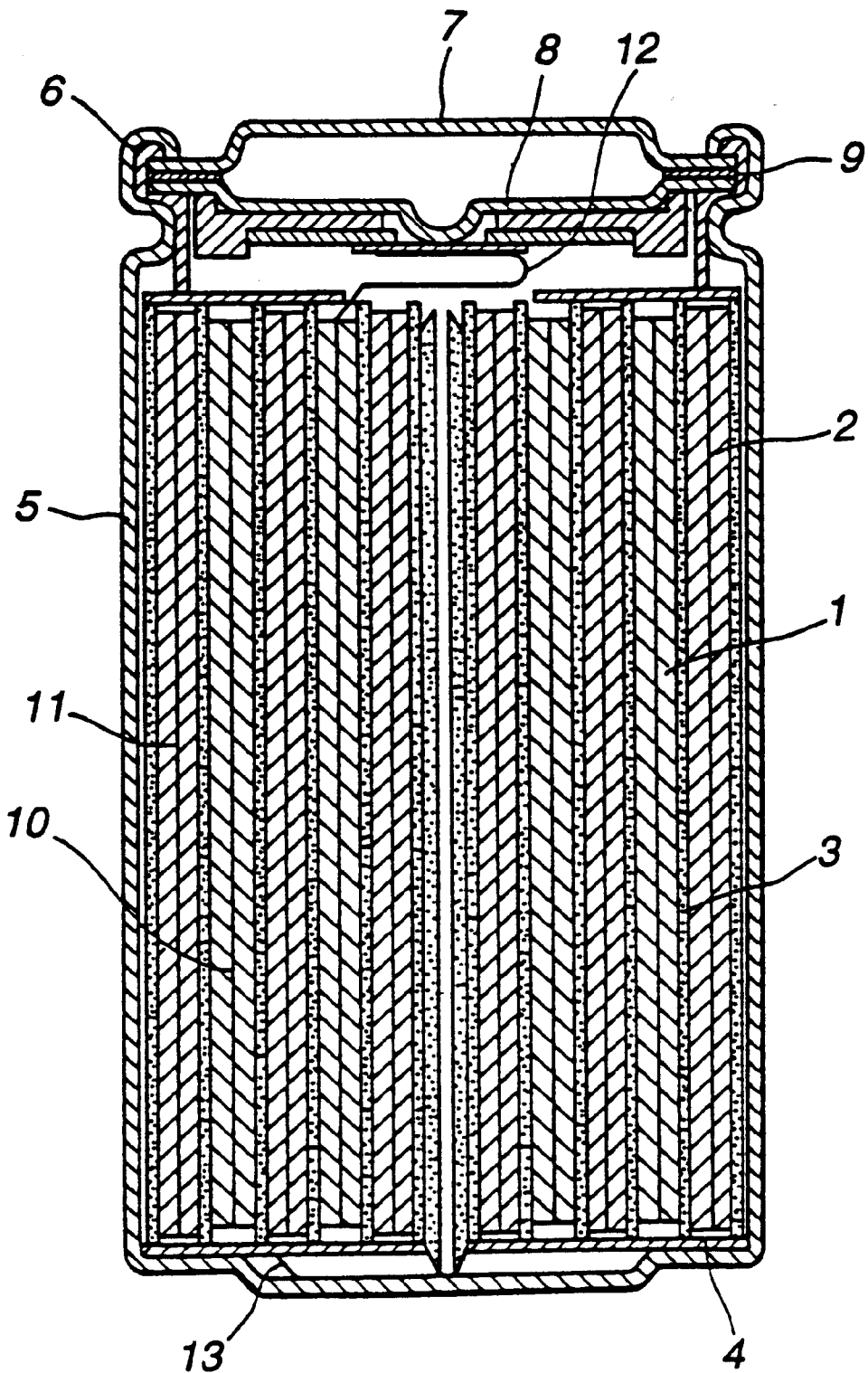
FIG. 1 is a cross sectional view showing the structure of a cylindrical battery according to the present invention.

Embodiments of the present invention will now be described.

A method of manufacturing a cathode active material according to the present invention includes the steps of mixing cobalt salts, lithium salts and aluminum hydroxide salts with one another and baking a prepared mixture so that lithium composite oxides are obtained each of which is expressed by $Li_xCo_{(1-y)}Al_yO_2$ (where $0.05 \leq x \leq 1.10$ and $0.01 \leq y < 0.10$).

$LiCoO_2$ is in the form of a crystal structure having a hexagonal system. If aluminum does not form a solid solution, the crystal is instable in a state where the lithium-ion secondary battery has been charged, that is, in a state where doped lithium has been removed from the cathode active material. Therefore, if the above-mentioned state is repeated (if charge and discharge cycles are repeated) or if thermal stress is imposed on $LiCoO_2$ in a charged state, the crystal structure is deformed (when the lithium-ion secondary battery is reserved at high environmental temperatures). As a result, lithium ions cannot normally be doped and removed. Thus, the performance required for the cathode active material cannot be maintained.

On the other hand, the lithium composite oxide ($Li_xCo_{(1-y)}Al_yO_2$) in which aluminum forms a solid solution is able to maintain the performance required for the cathode active material when doping and removing operations are performed at high environmental temperatures as well as at room temperatures. The reason for this lies in that the hexagonal crystal structure is stabilized when the charging operation is performed because aluminum forms a solid solution. Moreover, the stable crystal structure can be maintained even at high environmental temperatures.

The crystal structure of the aluminum oxide ($LiAlO_2$) containing lithium includes three types of crystal structures. Among the three types, $\alpha$-$LiAlO_2$ has a similar crystal structure as that of $LiCoO_2$. Therefore, it is preferably that a preparation process is performed in such a manner that $Al(OH)_3$ from which $\alpha$-$LiAlO_2$ can easily be prepared be employed in the preparing process. When $Li_xCo_{(1-y)}Al_yO_2$ is prepared from $Al(OH)_3$, the stability of the crystal structure can furthermore be improved as compared with an aluminum oxide prepared by using $Al_2O_3$.

As described above, the present invention is arranged in such a manner that aluminum hydroxide is employed to serve as the aluminum source. Therefore, the stability of crystal of the lithium composite oxide at high environmental temperature can be improved. As a result, a nonaqueous electrolyte secondary battery, having a structure that the lithium composite oxides are employed as the cathode active material and lithium is employed as anode active material which permits lithium to be doped and removed, enables a large capacity to be maintained even at high environmental temperatures. Moreover, satisfactory load resistance can be attained.

Note that the ratio of y of Al in $Li_xCo_{(1-y)}Al_yO_2$ is $0.01 \leq y < 0.10$. If the ratio of y of Al is lower than 0.01, the effect of improving the capacity maintenance at high environmental temperatures is unsatisfactory. If the ratio is not lower than 0.1, the battery capacity is undesirably reduced.

Specific baking conditions will now be described. It is preferable that the particle size of aluminum hydroxide be 10 $\mu$m or smaller. If the particle size is larger than 10 $\mu$m, the stability of the crystal deteriorates. Thus, capacity maintenance ratio is lowered. The reason for this which can be considered will now be described. Since the reactions for preparing the cathode active materials are solid state reactions, uniform $Li_xCo_{(1-y)}Al_yO_2$ cannot easily be prepared if aluminum hydroxide having a large particle size is employed. It is preferable that temperatures at which the mixture of cobalt salts, lithium salts and aluminum hydroxide is baked be in a range from 700° C. to 1100° C. If the baking temperature is higher than 1100° C., the lithium composite oxides are undesirably decomposed.

The lithium composite oxides manufactured by using aluminum hydroxide to serve as the aluminum source and expressed by $Li_xCo_{(1-y)}Al_yO_2$ (wherein $0.05 \leq x \leq 1.10$ and $0.01 \leq y < 0.10$) are cathode active materials exhibiting excellent crystal stability and free from considerable deterioration in the crystal even at high environmental temperatures.

Since the lithium composite oxides in which aluminum forms a solid solution has low electron conductivity, the load resistance deteriorates because the electron conductivity deteriorates if the particles size of the active substances is enlarged excessively. As a result, the discharging capacity on the large load side of the lithium composite oxide is reduced excessively. Therefore, it is preferable that the particle size of the cathode active material, that is, the obtained lithium composite oxide be 1 $\mu$m to 50 $\mu$m.

The present invention, having the structure that the above-mentioned lithium composite oxides are employed as the cathode active materials, and an appropriate anode active materials are employed so as to be combined with the cathode active materials to make a battery, realizes a large capacity. Moreover, an excellent discharging characteristics can be realized when a large load is applied.

The anode active material according to the present invention is not limited particularly. The anode active material is required to permit lithium metal or lithium to be doped and removed. The anode active material may be a lithium alloy of lithium and aluminum, lead, indium or the like, another carbon material which permits lithium to be doped and removed or polymer, such as polyacetylene or polypyrrole.

The carbon material for forming the anode is not limited particularly. The carbon material may be carbon which can be decomposed with heat, cokes (pitch cokes, needle cokes, petroleum cokes of the like), graphite, vitreous carbon, a baked organic polymer compound (a material obtained by baking phenol resin, furan resin or the like at appropriate temperatures), carbon fiber, active carbon or the like.

In particular, it is preferable that non-graphitizable carbon be employed because of great charging and discharging performance per weight must be employed which has a structure that the spacing of faces (002) is 0.370 nm or longer, the true density is lower than 1.70 g/cm$^3$ and no heat generation peak does not exist in a range not lower than 700° C. in a differential thermal analysis.

Materials having the above-mentioned characteristics are exemplified by a carboneous material which can be obtained by carbonizing an organic material by a method, for example, baking. The carbonizing process is performed by using a starting material exemplified by furan resin composed of homopolymer of copolymer of furfuryl alcohol or furfural. Specifically, it is preferable that a polymer be employed which is composed of a combination of furfural and phenol, that of furfuryl alcohol and dimethylolurea, furfuryl alcohol, a combination of furfuryl alcohol and formaldehyde, that of furfuryl alcohol and furfural and that of furfural and ketone.

As an alternative to this, a carboneous material may be employed which can be obtained by introducing functional groups containing oxygen into petroleum pitch having a hydrogen/carbon atom ratio of 0.6 to 0.8 to perform so-called oxygen crosslinking so that precursors containing oxygen in a quantity of 10 wt % to 20 wt % are prepared by baking the precursors.

Another carbonous material may be employed which is obtained by adding a phosphor compound or a boron compound when the furan resin or petroleum pitch is carbonized so as to enlarge the quantity of doping with respect to the quantity of lithium.

The graphite material must have a true specific gravity of 2.10 g/cm$^3$ or higher in order to realize a satisfactory characteristic for filling a mixture for the anode, more preferably the true specific gravity is 2.18 g/cm$^2$ or higher. To realize the above-mentioned true specific gravity, the spacing among faces detected by an X-ray analysis must be not shorter than 0.335 nm nor longer than 0.34 nm, more preferably not shorter than 0.335 nm nor longer than 0.337 nm. It is preferable that the thickness of crystal in the direction of c-axis be not smaller than 16.0 nm, more preferably 24.0 nm.

The above-mentioned materials for the anode may be employed. Thus, the nonacueous electrolyte secondary battery can be manufactured in which the lithium composite oxide, the aluminum source of which is aluminum hydroxide, is employed as the cathode active material and the non-graphitizable material which permits lithium to be doped and removed is employed as the anode. The thus-manufactured nonaqueous electrolyte secondary battery realized a ratio of 80% which is a ratio obtained by dividing a discharging capacity realized after 200 cycles have been performed at 60° C. by an initial capacity.

One cycle of the charging and discharging cycles is performed under condition that the charging voltage is 4.20 V, the charging current is 1 A, the charging operation is performed for 2.5 hours and the discharging operation is performed under condition that the discharging current is 250 mA and the final voltage is 2.50 V. The initial capacity is a discharging capacity measured at the second cycle.

The nonaqueous electrolyte secondary battery according to the present invention has the structure that the lithium composite oxide using the aluminum hydroxide as the aluminum source is used as the cathode active material. Therefore, the crystal structure of the cathode active material can be maintained even at high environmental temperatures. Thus, an excellent cycle characteristic and large load discharge characteristic can be realized.

It is preferable that the particle size of the cathode active material be 1 μm to 50 μm as described above. If the particle size of the cathode active material is too large, the electron conductivity deteriorates. In this case, the load resistance deteriorates, causing the discharging capacity on the large load side to be reduced.

Other elements for forming the above-mentioned nonaqueous electrolyte secondary battery, for example, nonaqueous electrolyte, a separator and the like may be the following elements.

The nonaqueous electrolyte is prepared by dissolving lithium salts serving as the electrolyte in an organic solvent. The organic solvent is not limited particularly. The organic solvent may be propylene carbonate, ethylene carbonate, 1, 2-dimethoxyethane, γ-butyrolactone, diethylether, tetrahydrofuran, 2-methyl-tetrahydrofuran, 1, 3-dioxolane, sulfolane, acetonitrile, dimethylcarbonate, diethylcarbonate, dipropylcarbonate, methylethylcarbonate, methylpropylcarbonate or their mixture.

Although the separator is not limited particularly, it may be made of woven fabric, unwoven fabric, a fine-porous film made of synthetic resin or the like. In particular, it is preferable that the fine-porous film made of synthetic resin is employed. It is preferable that fine-porous film made of polyolefine is employed because required thickness, strength and resistance of a formed film can be realized. Specifically, a fine-porous film made of polyethylene or polypropylene or that made of the two materials may be employed.

The shape of a collector of the electrode is not limited particularly. The collector may be formed into a foil shape or a net shape such as a mesh shape or expanded metal shape. It is preferable that the collector for the cathode is made of aluminum, stainless steel or nickel. The thickness of the collector for the cathode is 10 μm to 50 μm. It is preferable that the collector of the anode is made of copper, stainless steel or nickel. The thickness of the collector of the anode is 5 μm to 30 μm.

To obtain a safety shielded type nonaqueous electrolyte secondary battery, it is preferable that a safety valve or the like is provided which is operated when the internal pressure of the battery has been raised because of an abnormal conditions such as excess charge so as to interrupt a flow of an electric current.

EXAMPLES

Examples of the present invention will now be described.

Example 1

Initially, a cathode 1 structured as shown in FIG. 1 was manufactured as follows.

Lithium carbonate, cobalt oxide aluminum hydroxide having an average particle size of 5 μm were mixed in a ball mill in such a manner that the molar ratio Li/Co/Al=1.01/0.97/0.03. Then, an obtained mixture was temporarily baked in air at 600° C. for one hour, and then the mixture was baked in air at 900° C. for 10 hours. Thus, cathode active materials were prepared. The cathode active materials were crushed and classified so that cathode active materials having an average particle size of 5.1 μm were obtained. The average particle size was measured by a diffracting particle-size distribution measuring apparatus (LA-500 manufactured by Horiba). The "average particle size" is a median value of volume average particle size.

Then, 91 wt % of the obtained cathode active material, 6 wt % of graphite serving as a conductive material and 3 wt % of polyvinylidene fluoride were mixed so that a mixture for the cathode was prepared. The mixture was dispersed in N-methyl-2pyrolidone so that slurry for the cathode was obtained. The slurry for the cathode was applied to aluminum foil from which a collector 10 for the cathode was formed. Then, the slurry was dried, and then the aluminum foil was compressed and molded so that the cathode 1 was manufactured.

Then, an anode 2 was manufactured as follows.

Petroleum pitch was employed as the starting material. Functional groups each containing oxygen were introduced into petroleum pitch by 10% to 20% (oxygen crosslinking). Then, the material was baked at 1000° C. in an inert gas so that anode active materials were obtained. The obtained anode active materials were non-graphitizable carbon materials each having a structure near a vitreous carbon material. Then, 90 wt % of the carboneous material and 10 wt % of polyvinylidene fluoride were mixed so that a mixture for the anode was prepared. Then, the mixture was dispersed in N-methyl-2-pyrolidone so that mixture slurry for the anode was prepared. The mixture slurry for the anode was applied to the two sides of copper foil from which a collector 11 for the anode was formed. Then, the slurry was dried, and then the copper foil was compressed and molded so that an elongated anode 2 was manufactured.

The thus-manufactured cathode 1 and anode 2 were sequentially stacked and wound plural times through a separator 3 having a thickness of 25 μm and in the form of fine porous polypropylene film so that a spiral electrode was manufactured. Note that the spiral electrode was arranged in such a manner that the width and length of the anode 2 were larger than those of the cathode 1.

The thus-manufactured spiral electrode was accommodated in an iron battery can 5, and then insulating plate 4 was disposed on each of the upper and lower surfaces of the spiral electrode. To collect currents in the cathode 1 and the anode 2, an aluminum lead 12 was extended from the collector 10 of the cathode 1 so as to be welded to a safety-valve device 8 connected to a battery cover 7 through a PTC device 9. A nickel lead 13 was extended from a collector 11 for the anode 2 so as to be welded to the battery can 5. Then, electrolyte in which one mole of $LiPF_6$ was dissolved in a mixed solvent of 50 vol % propylene carbonate and 50 vol % of diethylcarbonate was injected into the battery can 5. Then, the battery cover 7 and the battery can 5 were caulked through a sealing gasket 6 applied with asphalt so that the battery cover 7 was secured. As a result, a cylindrical battery structured as shown in FIG. 1 and having a diameter of 18 mm and a height of 65 mm was manufactured.

Example 2

Lithium carbonate, cobalt oxide and aluminum hydroxide having an average particle size of 5 μm were mixed with one another in a ball mill at a molar ratio of Li/Co/Al=1.01/0.98/0.02. Then, a prepared mixture was temporarily baked in air at 600° C. for one hour, and then baked at 900° C. for 10 hours. Thus, a cathode active material was prepared. The thus-prepared cathode active material was crushed and mixed so that a cathode active material having a particle size of 4.8 μm was obtained.

The thus-prepared cathode active material was used so that a cylindrical battery was manufactured by a method similar to that according to Example 1.

Example 3

Lithium carbonate, cobalt oxide and aluminum hydroxide having an average particle size of 5 μm were mixed with one another in a ball mill at a molar ratio of Li/Co/Al=1.01/0.99/0.01. Then, a prepared mixture was temporarily baked in air at 600° C. for one hour, and then baked at 900° C. for 10 hours. Thus, a cathode active material was prepared. The thus-prepared cathode active material was crushed and mixed so that a cathode active material having a particle size of 4.7 μm was obtained. The thus-prepared cathode active mixture was used so that a cylindrical battery was manufactured by a method similar to that according to Example 1.

Example 4

Lithium carbonate, cobalt oxide and aluminum hydroxide having an average particle size of 5 μm were mixed with one another in a ball mill at a molar ratio of Li/Co/Al=1.01/0.93/0.07. Then, a prepared mixture was temporarily baked in air at 600° C. for one hour, and then baked at 900° C. for 10 hours. Thus, a cathode active material was prepared. The thus-prepared cathode active material was crushed and mixed so that a cathode active material having a particle size of 5.0 μm was obtained. The thus-prepared cathode active material was used so that a cylindrical battery was manufactured by a method similar to that according to Example 1.

Example 5

Lithium carbonate, cobalt oxide and aluminum hydroxide having an average particle size of 5 μm were mixed with one another in a ball mill at a molar ratio of Li/Co/Al=1.01/0.90/0.10. Then, a prepared mixture was temporarily baked in air at 600° C. for one hour, and then baked at 900° C. for 10 hours. Thus, a cathode active material was prepared. The thus-prepared cathode active material was crushed and mixed so that a cathode active material having a particle size of 4.6 μm was obtained. The thus-prepared cathode active material was used so that a cylindrical battery was manufactured by a method similar to that according to Example 1.

Comparative Example 1

Lithium carbonate and cobalt oxide were mixed with each other in a ball mill at a molar ratio of Li/Co=1.01/1.00. Then, a prepared mixture was temporarily baked in air at 600° C. for one hour, and then baked at 900° C. for 10 hours. Thus, a cathode active material was prepared. The thus-prepared cathode active material having a particle size of 4.9 μm was obtained. The thus-prepared cathode active material was used so that a cylindrical battery was manufactured by a method similar to that according to Example 1.

Comparative Example 2

Lithium carbonate, cobalt oxide and aluminum hydroxide having an average particle size of 5 μm were mixed with one another in a ball mill at a molar ratio of Li/Co/Al=1.01/0.995/0.005. Then, a prepared mixture was temporarily baked in air at 600° C. for one hour, and then baked at 900° C. for 10 hours. Thus, a cathode active material was prepared. The thus-prepared cathode active material was crushed and mixed so that a cathode active material having a particle size of 4.8 μm was obtained. The thus-prepared cathode active material was used so that a cylindrical battery was manufactured by a method similar to that according to Example 1.

Comparative Example 3

Lithium carbonate, cobalt oxide and aluminum hydroxide having an average particle size of 5 μm were mixed with one another in a ball mill at a molar ratio of Li/Co/Al=1.01/0.88/0.12. Then, a prepared mixture was temporarily baked in air at 600° C. for one hour, and then baked at 900° C. for 10 hours. Thus, a cathode active material was prepared. The thus-prepared cathode active material was crushed and mixed so that a cathode active material having a particle size of 4.9 μm was obtained. The thus-prepared cathode active material was used so that a cylindrical battery was manufactured by a method similar to that according to Example 1.

Comparative Example 4

Lithium carbonate, cobalt oxide and aluminum oxide having an average particle size of 5 μm were mixed with one another in a ball mill at a molar ratio of Li/Co/Al=1.01/0.97/0.03. Then, a prepared mixture was temporarily baked in air at 600° C. for one hour, and then baked at 900° C. for 10 hours. Thus, a cathode active material was prepared. The thus-prepared cathode active material was crushed and mixed so that a cathode active material having a particle size of 4.8 μm was obtained. The thus-prepared cathode active material was used so that a cylindrical battery was manufactured by a method similar to that according to Example 1.

The initial capacity and a capacity retention ratio at high environmental temperatures of each of the thus-manufactured cylindrical batteries according to the examples and comparative examples were measured. Moreover, the discharging capacity for performing large-load discharge was measured.

The initial capacity realized at a second cycle of two cycles of charging and discharging cycles performed in such a manner that charging process was performed for 2.5 hours under condition that the charging voltage was 4.20 V and the charging current was 1 A. Then, the discharging process was performed under condition that the discharging current was 250 mA and the final voltage was 2.50 V. The capacity retention ratio will now be described. A battery, the initial capacity of which was measured, was subjected to 200 cycles of charging and discharging cycles at 60° C. so that the discharging capacity was measured. The discharging capacity at a 200 th cycle was divided by the initial capacity so that the capacity retention ratio was obtained.

The discharging capacity under a large load will now be described. A battery, the initial capacity of which was measured, was charged for 2.5 hours under condition that the charging voltage was 4.20 V and the charging current was 1 A. Then, discharge was performed under condition that the discharging current was 1.5 A and the final voltage was 2.50 V. Then, the discharging capacity was measured.

Results of examples and comparative examples were shown in Table 1.

TABLE 1

| | Co/Al (molar ratio) | Al Source Type | Particle Size (μm) | Average Particle Size of Active Material (μm) |
|---|---|---|---|---|
| Example 1 | 0.97/0.03 | Aluminum Hydroxide | 5 | 5.1 |
| Example 2 | 0.98/0.02 | Aluminum Hydroxide | 5 | 4.8 |
| Example 3 | 0.99/0.01 | Aluminum Hydroxide | 5 | 4.7 |
| Example 4 | 0.93/0.07 | Aluminum Hydroxide | 5 | 5.0 |
| Example 5 | 0.90/0.10 | Aluminum Hydroxide | 5 | 4.6 |
| Comparative Example 1 | 1.00/0 | — | — | 4.9 |
| Comparative Example 2 | 0.995/0.005 | Aluminum Hydroxide | 5 | 4.8 |
| Comparative Example 3 | 0.88/0.12 | Aluminum Hydroxide | 5 | 4.9 |
| Comparative Example 4 | 0.97/0.03 | Aluminum Oxide | 5 | 4.8 |

| | Initial Capacity (mAh) | Capacity Retention Ratio During High Temperature Cycle (%) | 1.5A-Discharging Capacity (mAh) | 1.5A-Discharging Capacity/ Initial Capacity (%) |
|---|---|---|---|---|
| Example 1 | 1365 | 87 | 1203 | 88 |
| Example 2 | 1375 | 85 | 1207 | 88 |
| Example 3 | 1371 | 84 | 1201 | 88 |
| Example 4 | 1350 | 87 | 1187 | 88 |
| Example 5 | 1333 | 87 | 1176 | 88 |
| Comparative Example 1 | 1367 | 69 | 1213 | 89 |
| Comparative Example 2 | 1364 | 75 | 1207 | 89 |
| Comparative Example 3 | 1298 | 88 | 1131 | 87 |
| Comparative Example 4 | 1349 | 77 | 1180 | 88 |

As can be understood from results shown in Table 1, the cylindrical battery according to Example 1 manufactured by using aluminum hydroxide has an improved capacity retention ratio at high environmental temperatures as compared with the cylindrical battery according to Comparative Example 1 manufactured by using lithium composite oxide in which aluminum does not form a solid solution in spite of the same initial capacity. The cylindrical battery according to Example 1 has improved 1.5 A-discharge capacity at high environmental temperatures as compared with the cylindrical battery according to Comparative Example 4 having the lithium composite oxide prepared by the conventional method using aluminum oxide in spite of the same initial capacity. As a result, a fact can be understood that use of the lithium composite oxide, the raw material of is aluminum hydroxide, improves the stability of crystal of the prepared cathode active material at high environmental temperatures. Thus, a battery having a high discharging capacity retention ratio of 87% can be obtained.

The initial capacities of batteries having different composition ratios of Co/Al and capacity retention ratios of the same were subjected to comparisons. When ratio y of Al satisfies $0.01 \leq y < 0.10$, an excellent capacity retention ratio of 80% or higher can be obtained. If the ratio of Al is lower than 0.01, the effect of improving the capacity retention ratio at high environmental temperatures becomes unsatisfactory. If the ratio of Al is not lower than 0.1, the initial capacity is smaller than 1300 mAh. Therefore, the ratio y of Al must satisfy $0.01 \leq y < 0.10$ in order to prevent reduction in the capacity at high environmental temperatures while maintaining the initial capacity.

In Experimental Examples 1 to 5, the composition ratio of Co/Al was fixed to 0.97/0.03 to investigate the particle size of aluminum hydroxide.

Experimental Example 1

Lithium carbonate, cobalt oxide and aluminum hydroxide having an average particle size of 1 μm were mixed with one another in a ball mill at a molar ratio of Li/Co/Al=1.01/0.97/0.03. Then, a prepared mixture was temporarily baked in air at 600° C. for one hour, and then baked at 900° C. for 10 hours. Thus, a cathode active material was prepared. The thus-prepared cathode active material was crushed and mixed so that a cathode active material having a particle size of 4.9 μm was obtained. The thus-prepared cathode active material was used so that a cylindrical battery was manufactured by a method similar to that according to Example 1.

Experimental Example 2

Lithium carbonate, cobalt oxide and aluminum hydroxide having an average particle size of 3 μm were mixed with one another in a ball mill at a molar ratio of Li/Co/Al=1.01/0.97/0.03. Then, a prepared mixture was temporarily baked in air at 600° C. for one hour, and then baked at 900° C. for 10 hours. Thus, a cathode active material was prepared. The thus-prepared cathode active material was crushed and mixed so that a cathode active material having a particle size of 4.8 μm was obtained. The thus-prepared cathode active material was used so that a cylindrical battery was manufactured by a method similar to that according to Example 1.

Experimental Example 3

Lithium carbonate, cobalt oxide and aluminum hydroxide having an average particle size of 7 μm were mixed with one another in a ball mill at a molar ratio of Li/Co/Al=1.01/0.97/0.03. Then, a prepared mixture was temporarily baked in air at 600° C. for one hour, and then baked at 900° C. for 10 hours. Thus, a cathode active material was prepared. The thus-prepared cathode active material was crushed and mixed so that a cathode active material having a particle size of 5.2 μm was obtained. The thus-prepared cathode active material was used so that a cylindrical battery was manufactured by a method similar to that according to Example 1.

Experimental Example 4

Lithium carbonate, cobalt oxide and aluminum hydroxide having an average particle size of 10 μm were mixed with one another in a ball mill at a molar ratio of Li/Co/Al=1.01/0.97/0.03. Then, a prepared mixture was temporarily baked in air at 600° C. for one hour, and then baked at 900° C. for 10 hours. Thus, a cathode active material was prepared. The thus-prepared cathode active material was crushed and mixed so that a cathode active material having a particle size of 4.8 μm was obtained. The thus-prepared cathode active material was used so that a cylindrical battery was manufactured by a method similar to that according to Example 1.

Experimental Example 5

Lithium carbonate, cobalt oxide and aluminum hydroxide having an average particle size of 12 μm were mixed with one another in a ball mill at a molar ratio of Li/Co/Al=1.01/0.97/0.03. Then, a prepared mixture was temporarily baked in air at 600° C. for one hour, and then baked at 900° C. for 10 hours. Thus, a cathode active material was prepared. The thus-prepared cathode active material was crushed and mixed so that a cathode active material having a particle size of 5.0 μm was obtained. The thus-prepared cathode active material was used so that a cylindrical battery was manufactured by a method similar to that according to Example 1.

The initial capacity and capacity retention ratio at high environmental temperatures of the thus-manufactured cylindrical batteries were measured by methods similar to those according to Example 1. Results were shown in Table 2.

TABLE 2

|  | Co/Al (molar ratio) | Al Source | |
| --- | --- | --- | --- |
|  |  | Type | Particle Size (μm) |
| Experimental Example 1 | 0.97/0.03 | Aluminum Hydroxide | 1 |
| Experimental Example 2 | 0.97/0.03 | Aluminum Hydroxide | 3 |
| Experimental Example 3 | 0.97/0.03 | Aluminum Hydroxide | 7 |
| Experimental Example 4 | 0.97/0.03 | Aluminum Hydroxide | 10 |
| Experimental Example 5 | 0.97/0.03 | Aluminum Hydroxide | 12 |

TABLE 2-continued

|  | Average Particle Size of Active Material (μm) | Initial Capacity (mAh) | Capacity Retention Ratio During High Temperature Cycle (%) |
| --- | --- | --- | --- |
| Experimental Example 1 | 4.9 | 1362 | 86 |
| Experimental Example 2 | 4.8 | 1359 | 85 |
| Experimental Example 3 | 5.2 | 1357 | 83 |
| Experimental Example 4 | 4.8 | 1349 | 81 |
| Experimental Example 5 | 5.0 | 1341 | 78 |

As can be understood from results shown in Table 2, the capacity retention ratio at high environmental temperatures is lowered in inverse proportion to the particle size of the aluminum hydroxide. If the particle size is larger than 10 μm, the capacity retention ratio is made to be lower than 80%. Therefore, it is preferable that the particle size aluminum hydroxide is 10 μm or smaller to realize excellent capacity retention ratio at high environmental temperatures. In Experimental Examples 6 to 12, the composition ratio of Co/Al is fixed to 0.97/0.03 to investigate the particle size of lithium composite oxide serving as the active material. Note that Experimental Example 13 was performed in such a manner that a lithium composite oxide in which aluminum did not form a solid solution and the particle size was 68.8 μm.

Experimental Example 6

Lithium carbonate, cobalt oxide and aluminum hydroxide having an average particle size of 5 μm were mixed with one another in a ball mill at a molar ratio of Li/Co/Al=1.01/0.97/0.03. Then, a prepared mixture was temporarily baked in air at 600° C. for one hour, and then baked at 900° C. for 10 hours. Thus, a cathode active material was prepared. The thus-prepared cathode active material was crushed and mixed so that a cathode active material having a particle size of 0.6 μm was obtained. The thus-prepared cathode active material was used so that a cylindrical battery was manufactured by a method similar to that according to Example 1.

Experimental Example 7

Lithium carbonate, cobalt oxide and aluminum hydroxide having an average particle size of 5 μm were mixed with one another in a ball mill at a molar ratio of Li/Co/Al=1.01/0.97/0.03. Then, a prepared mixture was temporarily baked in air at 600° C. for one hour, and then baked at 900° C. for 10 hours. Thus, a cathode active material was prepared. The thus-prepared cathode active material was crushed and mixed so that a cathode active material having a particle size of 1.0 μm was obtained. The thus-prepared cathode active material was used so that a cylindrical battery was manufactured by a method similar to that according to Example 1.

Experimental Example 8

Lithium carbonate, cobalt oxide and aluminum hydroxide having an average particle size of 5 μm were mixed with one another in a ball mill at a molar ratio of Li/Co/Al=1.01/0.97/0.04. Then, a prepared mixture was temporarily baked in air at 600° C. for one hour, and then baked at 900° C. for 10 hours. Thus, a cathode active material was prepared. The thus-prepared cathode active material was crushed and mixed so that a cathode active material having a particle size of 3.2 μm was obtained. The thus-prepared cathode active material was used so that a cylindrical battery was manufactured by a method similar to that according to Example 1.

Experimental Example 9

Lithium carbonate, cobalt oxide and aluminum hydroxide having an average particle size of 5 μm were mixed with one another in a ball mill at a molar ratio of Li/Co/Al=1.01/0.97/0.03. Then, a prepared mixture was temporarily baked in air at 600° C. for one hour, and then baked at 900° C. for 10 hours. Thus, a cathode active material was prepared. The thus-prepared cathode active material was crushed and mixed so that a cathode active material having a particle size of 10.9 μm was obtained. The thus-prepared cathode active material was used so that a cylindrical battery was manufactured by a method similar to that according to Example 1.

Experimental Example 10

Lithium carbonate, cobalt oxide and aluminum hydroxide having an average particle size of 5 μm were mixed with one another in a ball mill at a molar ratio of Li/Co/Al=1.01/0.97/0.03. Then, a prepared mixture was temporarily baked in air at 600° C. for one hour, and then baked at 900° C. for 10 hours. Thus, a cathode active material was prepared. The thus-prepared cathode active material was crushed and mixed so that a cathode active material having a particle size of 29.5 μm was obtained. The thus-prepared cathode active material was used so that a cylindrical battery was manufactured by a method similar to that according to Example 1.

Experimental Example 11

Lithium carbonate, cobalt oxide and aluminum hydroxide having an average particle size of 5 μm were mixed with one another in a ball mill at a molar ratio of Li/Co=1.01/0.97/0.03. Then, a prepared mixture was temporarily baked in air at 600° C. for one hour, and then baked at 900° C. for 10 hours. Thus, a cathode active material was prepared. The thus-prepared cathode active material was crushed and mixed so that a cathode active material having a particle size of 49.7 μm was obtained. The thus-prepared cathode active material was used so that a cylindrical battery was manufactured by a method similar to that according to Example 1.

Experimental Example 12

Lithium carbonate, cobalt oxide and aluminum hydroxide having an average particle size of 5 μm were mixed with one another in a ball mill at a molar ratio of Li/Co/Al=1.01/0.97/0.03. Then, a prepared mixture was temporarily baked in air at 600° C. for one hour, and then baked at 900° C. for 10 hours. Thus, a cathode active material was prepared. The thus-prepared cathode active material was crushed and mixed so that a cathode active material having a particle size of 71.3 μm was obtained. The thus-prepared cathode active material was used so that a cylindrical battery was manufactured by a method similar to that according to Example 1.

Experimental Example 13

Lithium carbonate, cobalt oxide and aluminum hydroxide having an average particle size of 5 μm were mixed with one another in a ball mill at a molar ratio of Li/Co=1.01/1.00. Then, a prepared mixture was temporarily baked in air at 600° C. for one hour, and then baked at 900° C. for 10 hours. Thus, a cathode active material was prepared. The thus-prepared cathode active material was crushed and mixed so that a cathode active material having a particle size of 68.8 μm was obtained. The thus-prepared cathode active material was used so that a cylindrical battery was manufactured by a method similar to that according to Example 1.

The initial capacities, the capacity retention ratios at high environmental temperatures and discharging capacities under a large load of the thus-manufactured cylindrical batteries according to the experimental examples were measured. Results were shown in Table 3.

TABLE 3

| | Co/Al (molar ratio) | Average Particle Size of Active Material (μm) | Initial Capacity (mAh) |
|---|---|---|---|
| Experimental Example 6 | 0.97/0.03 | 0.6 | 1295 |
| Experimental Example 7 | 0.97/0.03 | 1.0 | 1330 |
| Experimental Example 8 | 0.97/0.03 | 3.2 | 1361 |
| Experimental Example 9 | 0.97/0.03 | 10.9 | 1364 |
| Experimental Example 10 | 0.97/0.03 | 29.5 | 1372 |
| Experimental Example 11 | 0.97/0.03 | 49.7 | 1377 |
| Experimental Example 12 | 0.97/0.03 | 71.3 | 1369 |
| Experimental Example 13 | 1.00/0 | 68.8 | 1373 |

| | Capacity Retention Ratio During High Temperature Cycle (%) | 1.5A-Discharging Capacity (mAh) | 1.5A-Discharging Capacity/Initial Capacity (%) |
|---|---|---|---|
| Experimental Example 6 | 83 | 1146 | 89 |
| Experimental Example 7 | 84 | 1184 | 89 |
| Experimental Example 8 | 86 | 1200 | 88 |
| Experimental Example 9 | 86 | 1196 | 88 |
| Experimental Example 10 | 85 | 1207 | 88 |
| Experimental Example 11 | 83 | 1184 | 86 |
| Experimental Example 12 | 82 | 1136 | 83 |
| Experimental Example 13 | 66 | 1207 | 88 |

As can be understood from the results shown in Table 3, the batteries according to Experimental Examples 8 to 12 having the lithium composite oxide in which aluminum forms a solid solution and which serves as the cathode active material exhibit the improved capacity retention ratio at high environmental temperatures regardless of the average particle size as compared with the battery according to Experimental Example 13. If the average particle size of the cathode active material is smaller than 1.0 μm, the filling ratio of the cathode active material is lowered because of reduction in the volume density of the electrode. As a result, the initial capacity is made to be smaller than 1300 mAh. If the average particle size of the cathode active material is larger than 50 μm, the 1.5 A-discharging capacity is made to be smaller than 1150 mAh because the load characteristic deteriorates in spite of similar initial capacity. In Experimental Example 13 in which the lithium composite oxide in which aluminum does not form a solid solution and which serves as the cathode active material, a similar 1.5 A-discharging capacity to that realized in Example 1 (average particle size is 5 μm) is realized even if the average particle size is larger than 50 μm. Therefore, it is preferable that the average particle size of the cathode active material in which aluminum forms a solid solution is 1 μm to 50 μm.

Although lithium carbonate is employed as lithium salts for use in the preparing process in the examples and experimental examples, a similar effect can be obtained if other lithium salts, such as lithium hydroxide or lithium nitrate, is employed. Although cobalt oxide is employed as cobalt salts for use in the preparing process in the examples and experimental examples, a similar effect can be obtained if other salts, such as cobalt hydroxide salts, cobalt carbonate salts or cobalt nitrate salts, are employed.

Although the present invention is applied to the cylindrical battery in the examples and experimental examples the present invention is not limited to the shape of the battery. The present invention may be applied to nonacueous electrolyte secondary batteries having various shapes including a rectangular shape, an oval shape, a coin shape, a button shape and a paper shape.

As can be understood from the foregoing description, the present invention having the structure that aluminum hydroxide is employed as the aluminum source to prepare the lithium composite oxide enables the cathode active material and the nonacueous electrolyte secondary battery to be obtained which exhibits an excellent cycle characteristic at high environmental temperatures and satisfactory discharging characteristic under a large load.

Although the invention has been described in its preferred form with a certain degree of particularity, it is understood that the present disclosure of the preferred form can be changed in the details of construction and in the combination and arrangement of parts without departing from the spirit and the scope of the invention as hereinafter claimed.

What is claimed is:

1. A method of manufacturing a cathode active material comprising the steps of:

mixing cobalt salts, lithium salts and aluminum hydroxide salts with one another; and baking a prepared mixture so that lithium composite oxides are obtained each of which is expressed by $Li_xCo_{(1-y)}Al_yO_2$ (where $0.05 \leq x \leq 1.10$ and $0.01 \leq y < 0.10$).

2. A method of manufacturing a cathode active material according to claim 1, wherein the particle size of aluminum hydroxide is not larger than 10 μm.

3. A method of manufacturing a cathode active material according to claim 1, wherein the particle size of the lithium composite oxide is 1 μm to 50 μm.

4. A nonaqueous electrolyte secondary battery comprising:

A cathode including lithium composite oxides expressed by a general formula $Li_xCo_{(1-1)}Al_yO_2$ (where $0.05 \leq x \leq 1.10$ and $0.01 \leq y < 0.10$) as an active material thereof, and wherein said cathode is formed from cobalt salts, lithium salts and aluminum hydroxide salts;

an anode made of non-graphitizable carbon material into which lithium can be doped and from which doped lithium can be removed; and a nonaqueous electrolyte, wherein
   a ratio obtained by dividing a discharging capacity realized after 200 cycles have been performed at 60° C. by an initial capacity of 80% or higher.

5. A nonaqueous electrolyte secondary battery according to claim 4, wherein the particle size of the lithium composite oxide is 1 μm to 50 μm.

* * * * *